United States Patent

Pelczynski

[11] Patent Number: 6,109,116
[45] Date of Patent: Aug. 29, 2000

[54] METHOD AND APPARATUS FOR USE IN INSTALLING A THROUGH-THE-WALL SENSING DEVICE IN A LABORATORY FUME HOOD

[75] Inventor: Paul E. Pelczynski, Arlington Heights, Ill.

[73] Assignee: Siemens Building Technologies, Inc., Buffalo Grove, Ill.

[21] Appl. No.: 08/873,009

[22] Filed: Jun. 11, 1997

[51] Int. Cl.[7] .................................................. G01F 1/46
[52] U.S. Cl. .......................................... 73/861.66; 454/56
[58] Field of Search ........................... 73/861.85, 204.25, 73/204.27, 861.65, 861.66, 861.67, 861.68; 454/56

[56] References Cited

U.S. PATENT DOCUMENTS

| | | | |
|---|---|---|---|
| 3,685,355 | 8/1972 | DeBaun | 73/861.66 |
| 3,765,241 | 10/1973 | Lambert | 73/861.66 |
| 3,895,531 | 7/1975 | Lambert | 73/861.66 |
| 4,377,969 | 3/1983 | Nelson . | |
| 4,570,493 | 2/1986 | Leemhuis | 73/861.65 |
| 4,982,605 | 1/1991 | Oram et al. | 454/56 |
| 5,123,288 | 6/1992 | Tench et al. | 73/861.66 |
| 5,365,795 | 11/1994 | Brower, Jr. | 73/861.65 |
| 5,562,537 | 10/1996 | Zver et al. . | |

*Primary Examiner*—George Dombroske
*Assistant Examiner*—Paul D. Amrozowicz
*Attorney, Agent, or Firm*—Greer, Burns & Crain, Ltd.

[57] ABSTRACT

A method and apparatus for use in installing a through-the-wall sensing device in a laboratory fume hood. The apparatus includes a sample tube with an outlet and a plurality of apertures and the tube is interconnected to an anemometer. The method includes placing the outlet in a number of positions inside of a fume hood to simulate a sidewall adapter for a through-the-wall sensing device in order to locate an optimum position for a through-the-wall sensing device. The method also includes fixing the sample tube in a number of positions within the fume hood while variably covering some of the apertures to simulate numerous locations and configurations for an averaging tube used with a through-the-wall sensing device. Therefore, an optimum location and configuration for an averaging tube can be readily determined.

15 Claims, 1 Drawing Sheet

METHOD AND APPARATUS FOR USE IN INSTALLING A THROUGH-THE-WALL SENSING DEVICE IN A LABORATORY FUME HOOD

The present invention generally relates to the ventilation of laboratory fume hoods, and more particularly to a method and apparatus for use in installing air flow sensing components of fume hood monitoring equipment to optimize the operating accuracy of the equipment.

Experimental work involving chemicals in a laboratory environment requires the use of fume hoods to confine the chemical fumes and thereby protect the individuals who are working in the laboratory. Such fume hoods generally have an enclosure with a front (face) opening and one or more movable doors (often called sashes). The sashes are adapted to cover the opening, but can be opened to gain access to the interior of the enclosure for the purpose of performing experiments or other work. The enclosure is typically connected to a forced air exhaust system driven by a blower. The air from the fume hood is constantly being removed through the exhaust duct which carries any noxious fumes away so that an individual should not be exposed to the fumes while performing work in the hood.

Because of the danger posed by malfunctioning fume hoods, monitors have been developed to detect the average velocity of air entering the face of a hood (known as face velocity). Typically, these monitors activate a warning when the face velocity falls below a safe level. Also, some hoods employ sophisticated controllers which rely upon measurements of face velocity to adjust the exhaust system to provide the proper amount of flow to insure safety of the individuals who may be in the laboratory near the fume hoods, while also reducing to a minimum the amount of air that is expelled from the fume hoods and therefore the room. The less the amount of air removed from the room, the less air is necessary to replace the removed air. Obviously, if the fume hood is being operated during the winter and the replacement air has to be heated, substantial energy and therefore cost is required to heat the replacement air. Similarly, such energy considerations apply in cooling replacement air in the summer.

Face velocity can be measured by an anemometer connected to an opening in a sidewall of the fume hood. The anemometer measures the velocity of air flow though the opening in the side wall which is known to correlate to face velocity. However, one of the problems associated with through-the-wall measurements is the difficulty of determining the location for the opening in the side wall. A number of conditions affect air flow patterns inside the fume hood, including the design of the enclosure, air flow patterns within the laboratory environment, and the design, number and position of the sashes. Turbulence in proximity to the side wall opening can affect the velocity of air flow through the opening. Accordingly, it is necessary to position the opening in a location within the hood where the air flow pattern is consistent, regardless of the position of the sashes. Since air flow patterns in fume hoods are unpredictable, the common practice for finding the desired location of an opening for a through-the-wall monitor has been the use of smoke testing and trial and error.

Smoke is used to find a location within the hood where the air pattern remains consistent while the sashes are opened or closed. If this location is found, a hole is drilled in a sidewall at the height and depth of the consistent smoke pattern. The anemometer is then connected to this hole on the outside of the hood, either directly or by way of a flexible hose. Air velocity readings are taken with the sashes in a number of positions ranging from fully opened to fully closed. The goal is to find the location for the opening where the anemometer records an increasing air velocity as the sashes are moved from opened to closed.

Regularly, the position of the opening predicted by the smoke does not produce the desired pattern of air velocity needed to accurately correlate face velocity, i.e., the air velocity through the opening does not increase as the sashes are moved from opened to closed. Therefore, the practice has been to create another opening in the general vicinity of the first opening and determine if the new opening produces the desired results. This process continues on a trial and error basis until an acceptable location is found.

In fume hoods with multiple sashes, such slidable horizontal sashes, it may be impossible to find a location that will provide the desired air velocity pattern. Accordingly, the practice has been to install a tube with a number of holes that simulate a number of openings in the sidewall. This tube, known as an averaging tube, connects to one hole in the sidewall and extends horizontally across the inside of the hood for horizontal sashes or vertically down a sidewall for vertical sashes. The holes in the averaging tube allow for numerous outlets for air flowing through the sidewall opening. Therefore, problems with inconsistent air flow patterns within the hood are minimized since the tube has outlets in a number of locations within the hood.

Problems associated with averaging tubes include the difficulty determining the proper location for the tube as well as the number and position of the holes on the tube. In practice, the position for the tube and the configuration for the holes is usually determined on a trial and error basis. A tube is mounted and air velocity readings are taken with the sashes in different positions from fully opened to fully closed. The tube's location and hole configuration are adjusted until the appropriate air velocity pattern is obtained.

Accordingly, it is a primary object of the present invention to provide an improved method for locating an optimum position for a through-the-wall sensing device in a laboratory fume hood.

Another object of the present invention is to provide an improved apparatus for use in locating an optimum position for a through-the-wall sensing device in a laboratory fume hood.

It is a further object of the present invention to provide an improved method for determining an optimum configuration of an air velocity averaging tube for use with a through the wall sensing device in laboratory fume hood.

It is still another object of the present invention to provide an improved apparatus for determining an optimum location and configuration of an air velocity averaging tube for use with a through the wall sensing device in laboratory fume hood.

Other objects and advantages of the present invention will become apparent upon reading the following detailed description, while referring to the attached drawings, in which.

DETAILED DESCRIPTION

Figure 1:
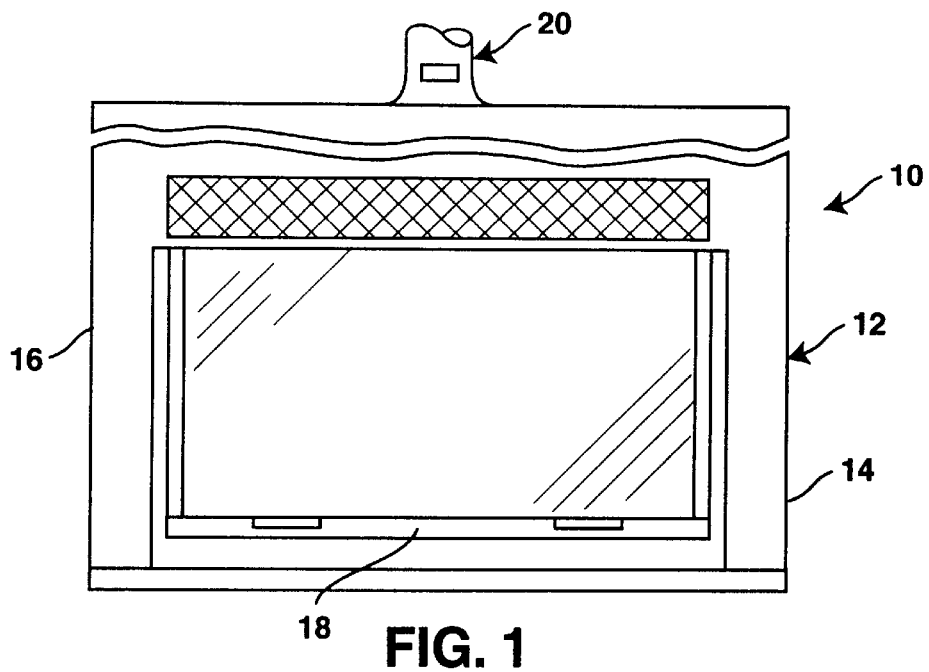
FIG. 1 is a front elevational view of a laboratory fume hood with a vertical sash.

The present invention is directed to an apparatus and a method for locating an optimum position for a through-the-wall sensing device in a laboratory fume hood. The invention is also directed to the use of the apparatus to determine the optimum configuration for an air velocity averaging tube to be used with a through-the-wall sensing device.

Through-the-wall sensing devices rely upon air velocity measuring equipment, such as an anemometer, to determine the velocity of air flow through an opening, typically in a sidewall of a fume hood. Air enters the fume hood through the opening because the air pressure within the fume hood is lower than the ambient air pressure in the laboratory. The air flows from the higher pressure environment of the laboratory to the lower pressure environment inside the fume hood. If the air flow through the fume hood exhaust system is held constant, the pressure inside the hood decreases as the area of the face opening decreases. Therefore, the velocity of the air flow through the face opening and the sidewall opening increase as the sashes are moved from opened to closed. It is known that the velocity of the air flow through a sidewall opening correlates to face velocity. Accordingly, a through-the-wall sensing device can be used as a monitor of face velocity or, as part of a control system, to control face velocity by adjusting the exhaust system.

Once installed, the through-the-wall sensing device includes a connection between an adapter at the opening in the side wall of the fume hood and the measuring device. However, unpredictable air flow patterns within laboratory hoods makes the determination of the location for the side wall adapter difficult. In order for though-the-wall air velocity to correlate to face velocity, the sidewall adapter must be positioned in a area of steady and non-turbulent air flow. One of the advantages of the present invention is that it allows for the simulation of a sidewall opening. Therefore, any number of positions for a sidewall opening can be tested before any holes need to be drilled in the sidewall.

In some hoods a location producing the desired air velocity pattern cannot be found. In these instances, an averaging tube can be suspended within the hood and extended to meet the sidewall adapter. The averaging tube provides numerous openings for air to flow from the sidewall adapter into the hood. This helps to reduce the variability associated with turbulence patterns within the hood by providing air outlets over a variety of positions within the hood. However, the difficulty with using the averaging tube is determining the optimum location for the tube and the number and location of the outlet openings along the averaging tube. An advantage of the present invention is that when an averaging tube is needed, the invention allows for ease of adjustment between numerous locations for and configurations of averaging tubes to determine which are the most appropriate for a particular fume hood. Therefore, a permanent tube can be fabricated and installed based upon an optimum configuration that is determined by the present invention.

Broadly stated, the present invention provides for an elongated tube with a number of linearly aligned apertures between an inlet opening in one end portion and an outlet opening in the opposite end portion. A flexible tube connects the inlet opening to an air velocity measuring device. In one embodiment of the invention, the apertures are covered and the apparatus is temporarily fixed adjacent to a sidewall on the interior of a fume hood with the location of the outlet being positioned in a location believed to be appropriate for a side wall adaptor. Measurements from the anemometer are taken as the sashes are closed to determine whether the velocity of air through the outlet increases as the sashes are closed. If not, then a new location is chosen until the location with the desired air pattern is located.

In the event that no such location can be found, an averaging tube can be used. The apparatus of the present invention is used as part of a method to determine the optimum location and configuration of the averaging tube. With the outlet opening covered and the apertures uncovered, the tube is fixed in a number of positions inside the fume hood and interconnected to an air velocity measuring device. Velocity readings from the measuring device are taken with the sashes in a number of positions from fully opened to fully closed. By this method, it is possible to determine the location for the tube, and number and position of open apertures, that produce a increase in air velocity through a sidewall opening as the sashes are moved from opened to closed.

Turning now to the drawings, and particularly FIG. 1, a laboratory fume hood, indicated generally at 10, is shown to have an outer frame 12, with a right side wall 14 and a left side wall 16. A vertical sash 18, shown in a lowered position, can be raised to allow a technician to gain access to work in the hood. An exhaust duct 20 connects to an exhaust blower (not shown) to remove the air within the hood 10. Although FIG. 1 shows the hood 10 with a vertical sash 18, it will be understood that laboratory fume hoods have many different sash designs including multiple vertical sashes and multiple sliding or folding horizontal sashes. When discussed below, a reference to a sash 18 includes generally all of the possible sash configurations.

Figure 2:
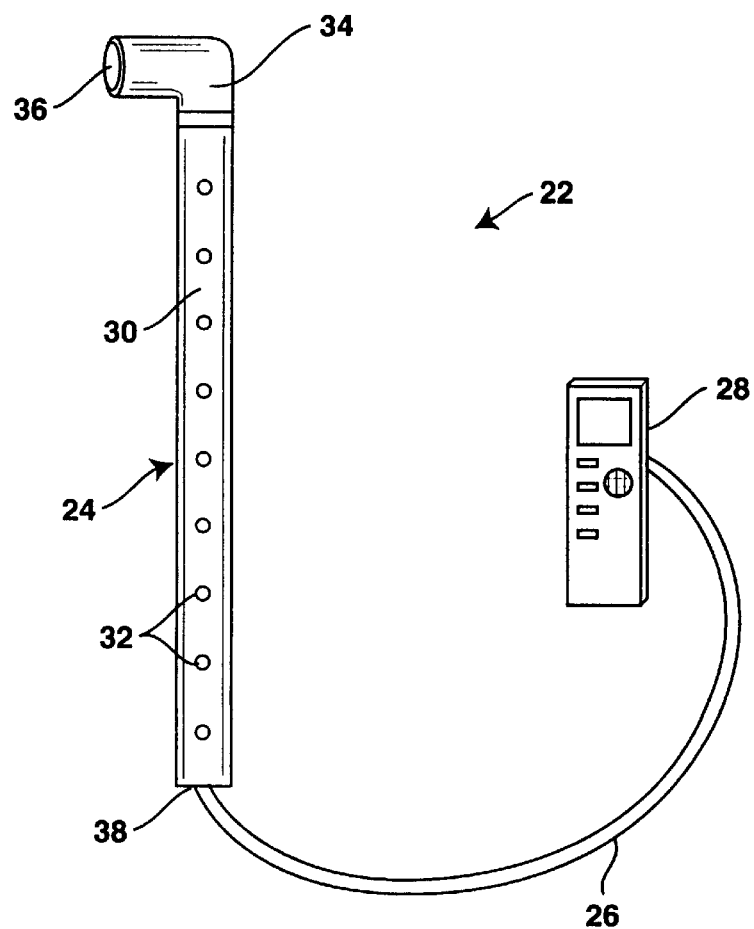
FIG. 2 is an elevational view of the apparatus of the present invention.

The present invention is shown in FIG. 2 being generally indicated at 22. The invention 22 includes an elongated hollow sample tube 24, a flexible tube 26, and an anemometer 28. The sample tube 24 has a sidewall 30 with a plurality of linearly aligned, and generally equidistantly spaced, apertures 32. A ninety degree elbow 34, is tightly attached to one end of the sample tube 24, and creates an outlet 36 for the sample tube 24. One end of the flexible tube 26 is attached to a sample tube inlet 38 to allow for the free flow of air between the sample tube 24 and the flexible tube. The sample tube 24 and the elbow 34 are preferably a rigid plastic such as Schedule 40 PVC but it is contemplated that any number of materials will provide the necessary rigidity. The flexible tube 26 is preferable attached to sample tube 24 by a friction fit between the exterior of the flee tube with the interior of the sample tube. However, one skilled in the art could readily find suitable alternative methods to air-tightly connect the tubes 24 and 26 including chemical adhesion and the like. It is further contemplated that the flexible tube 26 may be larger in diameter than the sample tube 24.

The anemometer 28, connected to a second end of the flexible tube 26, measures the velocity of air flow into the flexible tube 26 and, therefore, through the the outlet 36 or the apertures 32 of sample tube 24. Preferably, the surface area of the outlet 36 should be approximately equal to or greater than the surface area of a cross-section of the sample tube 24 or the flexible tube 26, whichever is smaller. Likewise, the cumulative total area of the apertures 32 should be equal to or greater than the smaller of these cross-sections. This relationship ensures that the velocity of air flow through the outlet 36 or the apertures 32 is equal to the velocity of air flow at the anemometer 28. The anemometer is preferably a single point hot wire anemometer which is well known in the art In operation, the sample tube is mounted to the inside of the fume hood against one of the sidewalls 14 or 16. This position can be determined by mere guess or by the use of smoke to attempt to determine where the air patterns within the hood appear most stable as the sash 18 is moved from fully opened to fully closed. A piece of tape (not shown), or any other temporary mounting device, can be used to mount the sample tube 24. Also, a piece of tape should be used to cover the nine apertures 32 to block off air flow through the apertures. The outlet 36 should be directed to the opposing sidewall and the anemometer 28 should be placed outside of the fume hood 10 and away from air currents within the laboratory.

With the exhaust blower operating at a constant speed, the sash 18 should be fully opened and the a base reading from the anemometer 28 should be noted. Next, the sash should be moved incrementally from fully opened to fully closed and readings from the anemometer should be noted at each increment. The object is to determine the location of the outlet where the speed of the air flow though the outlet steadily increases as the sash is closed. Accordingly, if the first chosen location does not provide the desired increase in air velocity, the outlet 36 tube should be moved to additional locations adjacent to one of the sidewalls 14 or 16 until a location is found which produces the desired air velocity pattern.

The outlet 36 simulates the performance a sidewall adapter of a permanently installed fume hood monitor or controller. Therefore, once the location is found, it can be marked and a hole can be drilled in the sidewall to mount a permanent monitoring device. The advantage of the invention 22 is that several locations can be tested prior to the need for drilling holes in the sidewall.

In some hoods, it may be impossible to locate a position for a sidewall opening that will produce the desired air velocity pattern. Accordingly, the sample tube 24 may be used to determine an optimum location and configuration for an averaging tube. To accomplish this, the outlet 36 of the tube should be blocked off by any suitable means including tape. The apertures 32 should be uncovered. For hoods with horizontal sashes the sample tube 24 should be suspended by any temporary means, including tape or wire, parallel to, behind and above the sash 18 on the inside of the hood 10. For vertical sashes, the tube 24 should be suspended vertically next to a sidewall 14 or 16 and approximately centered behind the sash 18. For both horizontal and vertical mounting, the apertures 32 should face the rear of the hood 10. With the anemometer 28 located outside the hood, readings should be taken with the sash 18 in a number of incremental positions from fully opened to fully closed. The object is to find a position for the sample tube 24 and the number and position of the apertures 32 which will produce an increased air velocity at the inlet 38 of the tube 24 as the sash 18 is closed.

The number and position of the apertures 32 can be adjusted by variably covering one or more of the apertures with tape. Also, the position of the sample tube within the hood can be adjusted. Once an appropriate sample tube location and aperture configuration are determined, a permanent sample tube can be fabricated and mounted. An advantage of the sample tube 24 is that an optimum configuration for and location for a permanent tube can be determined before the permanent tube needs to be fabricated or mounted. The permanent tube can then be connected by an extension tube to any conveniently located opening in the sidewall.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for use in simulating the location of a through-the-wall sensing means of the type which requires a hole be located in at least one of the sidewalls of a laboratory fume hood having sidewalls, a face opening and an adjustable sash door adapted to vary the size of the face opening when manipulated by a user, said apparatus being adapted for use in locating the optimum location for placing the hole to provide consistent air flow measurements throughout a range of sash door positions in the face opening, said apparatus comprising:

an elongated hollow tube being adapted to communicate air therethrough, said tube being sufficiently rigid to maintain its configurational shape during use, said tube having a generally 90 degree elbow with an inlet opening in one end portion thereof and an outlet opening in an opposite end portion, said inlet opening thereby being in a position whereby it is generally in a plane parallel to the sidewall and adapted to receive air flow in a manner simulating a hole in the sidewall, said tube being sufficiently long to enable a user to locate the inlet opening over a broad range of positions along one of the sidewalls with the sash door being in varying positions to thereby enable an optimum location for placement of the hole in the sidewall;

means for measuring air velocity; and, a flexible tubing interconnecting said outlet opening of said tube with said measuring means so that said measuring means measures the velocity of the air entering said inlet opening of said tube.

2. The apparatus according to claim 1 wherein said means for measuring air velocity is an anemometer.

3. The apparatus according to claim 1 wherein said means for measuring air velocity is a single point hot-wire anemometer.

4. The apparatus according to claim 1 wherein the area of said outlet opening is approximately equal to or greater than the lessor of one of the area of a cross section of said elongated tube and the area of a cross section of said flexible tubing.

5. A method for locating an optimum position of a through-the-wall sensing means for a laboratory fume hood with opposing side walls and a face opening with one or more sashes adapted to vary the size of the face opening from fully opened to fully closed, said method comprising:

placing an outlet of a rigid elongated hollow tube inside of the fume hood, said tube being adapted to communicate air therethrough and further having an inlet interconnected to a measuring means located outside of the fume hood for measuring the velocity of air entering said inlet;

adjusting the position of said outlet while varying the size of the face opening from fully opened to fully closed whereby a position is located where the velocity of air entering said inlet of said elongated tube generally increases as the size of the face opening varies from fully opened to fully closed.

6. The method according to claim 5 wherein said means for measuring air velocity is a single point hot-wire anemometer.

7. An apparatus for identifying an optimum location for an air velocity averaging tube for use with a through the wall sensing means of the type which requires a hole be located in at least one of the sidewalls of a laboratory fume hood having a face opening and an adjustable sash door adapted to vary the size of the face opening when manipulated by a user, said apparatus being adapted for use in locating the optimum location for placing the hole to provide consistent air flow measurements throughout a range of sash door positions in the face opening, said apparatus comprising;

an elongated hollow tube being adapted to communicate air therethrough, said tube being sufficiently rigid to maintain its configurational shape during use, said tube having a generally 90 degree elbow with an inlet opening in one end portion thereof, an outlet opening in an opposite end, and a plurality of linearly aligned apertures between said inlet and said opposite end, said inlet opening thereby being in a position whereby it is generally in a plane parallel to the sidewall and adapted to receive air flow in a manner simulating a hole in the sidewall, said tube being sufficiently long to enable a user to locate the inlet opening over a broad range of positions along one of the sidewalls with the sash door being in varying positions to thereby enable an optimum location for placement of the hole in the sidewall;

means for measuring air velocity; and, a flexible tubing interconnecting said outlet opening of said tube with said measuring means so that said measuring means measures the velocity of the air entering said inlet opening of said tube.

8. The apparatus according to claim 7 wherein said apertures are approximately equidistantly spaced on said elongated tube.

9. The apparatus according to claim 7 wherein the total area of said plurality of apertures is approximately equal to the lessor of one of the area of a cross section of said elongated tube and the area of a cross section of said flexible tubing.

10. A method for identifying an optimum configuration for an air velocity averaging tube for use with a through-the-wall sensing means in a laboratory fume hood having a face opening with one of more sashes adapted to vary the size of the face opening from fully opened to fully closed, said method comprising:

placing a rigid elongated hollow tube inside of the fume hood, said tube being adapted to communicate air therethrough and further having a closed end, a plurality of linearly aligned apertures, and an inlet interconnected to a measuring means located on the outside of the fume hood for measuring the velocity of air entering said inlet;

selectively covering one or more of said plurality of apertures to achieve a variety of aperture configurations while varying the size of the face opening from fully opened to fully closed whereby an aperture configuration is determined where the velocity of air entering said inlet of said elongated tube constantly increases as the size of the face opening varies from fully opened to fully closed.

11. The method according to claim 10 wherein said apertures are approximately equidistantly spaced.

12. The method according to claim 10 wherein said plurality of apertures are directed to the rear of the fume hood.

13. The method according to claim 10 wherein said elongated tube is positioned horizontally above and behind said sashes.

14. The method according to claim 10 wherein said elongated tube is positioned vertically behind said sashes.

15. The method according to claim 10 further comprising the steps of placing said elongated tube in additional locations whereby a position is located where the velocity of air entering said inlet opening increases as the sashes are moved from fully opened to fully closed.

* * * * *